United States Patent
Knutson et al.

(10) Patent No.: US 8,452,805 B2
(45) Date of Patent: May 28, 2013

(54) GENEALOGY CONTEXT PRESERVATION

(75) Inventors: Charles Douglas Knutson, Salem, UT (US); Jonathan Leo Krein, Provo, UT (US); Daniel Zappala, Cedar Hills, UT (US); Daniel Pierce Delorey, Duvall, WA (US)

(73) Assignee: Kinpoint, Inc., Salem, UT (US)

( * ) Notice: Subject to any disclaimer, the term of this patent is extended or adjusted under 35 U.S.C. 154(b) by 119 days.

(21) Appl. No.: 12/717,466

(22) Filed: Mar. 4, 2010

(65) Prior Publication Data

US 2010/0228770 A1    Sep. 9, 2010

Related U.S. Application Data

(60) Provisional application No. 61/209,372, filed on Mar. 5, 2009.

(51) Int. Cl.
   *G06F 17/30*    (2006.01)
(52) U.S. Cl.
   CPC .............................. *G06F 17/30424* (2013.01)
   USPC ............ 707/769; 707/758; 707/791; 707/802
(58) Field of Classification Search
   CPC .............................................. G06F 17/30424
   USPC ............. 707/1, 100, 104, 769, 758, 791, 802, 707/811
   See application file for complete search history.

(56) References Cited

U.S. PATENT DOCUMENTS

| | | | |
|---|---|---|---|
| 6,760,731 B2 * | 7/2004 | Huff | 707/999.006 |
| 7,461,061 B2 | 12/2008 | Aravamudan et al. | |
| 7,463,792 B2 * | 12/2008 | Peterschmidt | 382/305 |
| 7,870,139 B2 * | 1/2011 | Cookson et al. | 707/748 |
| 2005/0147947 A1 | 7/2005 | Cookson, Jr. et al. | |
| 2005/0267903 A1 * | 12/2005 | Golze | 707/100 |
| 2006/0224631 A1 * | 10/2006 | Kwon | 707/104.1 |
| 2007/0168368 A1 * | 7/2007 | Stone | 707/100 |
| 2007/0266003 A1 * | 11/2007 | Wong et al. | 707/3 |
| 2008/0172407 A1 * | 7/2008 | Sacks | 707/102 |
| 2008/0270431 A1 * | 10/2008 | Garbero | 707/100 |
| 2010/0106573 A1 * | 4/2010 | Gallagher et al. | 705/14.4 |

OTHER PUBLICATIONS

Author Unknown; GenSmarts Automated Genealogy Research Software; 2 pages; retrieved Mar. 4, 2010; http://www.rootsmagic.com/GenSmarts/ (Copy Attached).

\* cited by examiner

*Primary Examiner* — Fred I Ehichioya
*Assistant Examiner* — Dangelino Gortayo
(74) *Attorney, Agent, or Firm* — Workman Nydegger

(57) ABSTRACT

Preserving context and providing suggestions for genealogy searching. A method includes storing in a storage medium previous user interaction with a genealogical research system from a previous genealogical research session. Initiation of a new genealogical research session is detected. In response to the new research session and based on the previous user interaction with the research system, the system provides suggestions for continuing genealogical research.

20 Claims, 2 Drawing Sheets

GENEALOGY CONTEXT PRESERVATION

CROSS-REFERENCE TO RELATED APPLICATIONS

This application claims the benefit of U.S. Provisional application 61/209,372 filed Mar. 5, 2009, titled "20 Minute Genealogist", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computers have also been used extensively in performing research. Computers can be used in numerous aspects of research including finding information and organizing and storing information. Connections to wide area networks allow computers to search for data stored in far-away and obscure places without a researcher needing to leave the comfort of a local office. Data storage capabilities and organizational software allow researchers to organize and store vast amounts of researched and discovered information.

With the ability to perform such wide ranging research and to store such large amounts of information, keeping track of what research has been performed and selecting the best research methods can be a daunting task for a human user. Additionally, some research is performed on an amateur basis such that substantial periods of time may exist between research sessions. For example, much of the genealogical research that is performed occurs during short intervals of time available to amateur researchers in-between employment, social, and family obligations. It is not uncommon for weeks, months or even years to pass by between such research sessions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method that may be practiced in a computing environment. The method includes acts for preserving context and providing suggestions for genealogy searching. The method includes storing in a storage medium previous user interaction with a genealogical research system from a previous genealogical research session. Initiation of a new genealogical research session is detected. In response to the new research session and based on the previous user interaction with the research system, the system provides suggestions for continuing genealogical research.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein facilitate the ability to maintain context of search activities and/or provide suggestions for additional search activities for a search session based on user interaction with a search system during a previous search session.

Figure 1:
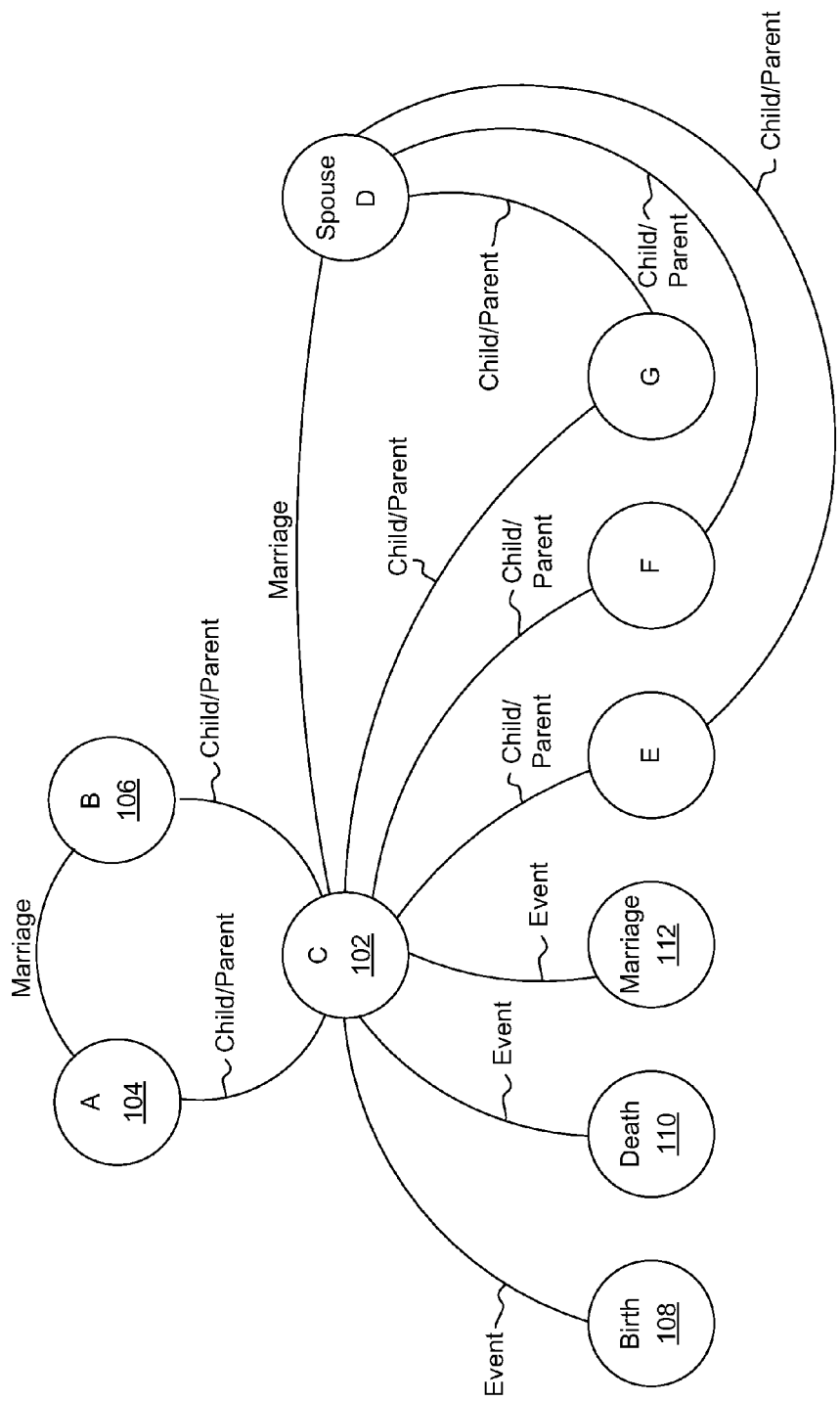
FIG. 1 illustrates genealogical graph illustrating familial relationships.

Genealogical research is inherently complicated. In particular, due to the exponential expansion nature of both ancestors and progeny, information that can be found about or related to an individual is seemingly limitless. A simple example is illustrated in FIG. 1 which shows an edge directed labeled graph for an individual "C". FIG. 1 illustrates an individual node 102 representing the individual "C". As illustrated, individual "C" had parents "A" and "B" represented by individual nodes 104 and 106 respectively through the illustrated child/parent relationship edges.

Individual "C" also has certain events associated with individual "C". In the example illustrated, a birth event, a death event, and a marriage event are shown and represented by event nodes 108, 110, and 112 respectively. Each of these nodes should ideally include a complete record of the represented event. For example, a complete record may be defined as one that has a date and a location of a particular event (e.g. the date and location that an individual was born).

Besides parents "A" and "B", individual "C" may be related to other individuals as well. For example, FIG. 1 illustrates that individual "C" is related to individual "D" (represented by individual node 114, by a marriage relationship (illustrated by a marriage edge in FIG. 1). Individual "C" may also have children. FIG. 1 illustrates individual "C's" relationship to three children "E", "F" and "G" by the child/parent relationship edges to nodes 116, 118 and 120 respectively.

The representation shown in FIG. 1 shows a single generation of ancestors for individual "C" and a single generation of progeny for individual "C". However, it can readily be appreciated that if relationships and nodes are added for each existing node, and iteratively added for added nodes in either direction or both directions (either towards ancestors or/and progeny), the amount of information related to a single individual can have exponential growth potential. Thus, one can quickly appreciate the complexities and difficulties of gathering node and relationship information, especially when it is done on a sporadic and/or infrequent basis.

However, some embodiments described herein may include research systems that are able to persist search activity state and to provide users with suggested areas of research based on previous activities performed at the system.

Illustratively embodiments may address at least two aspects: 1) setting up a research process or context within which an individual can track their own genealogy research; 2) maintaining this context over time. A research process and research activities may include using or generating some set of notes, documents, or tools that an individual may utilize to keep track of their research goals and subsequent progress. To give one example, an active genealogist may say something like: "I'm working on my maternal grandmother's line." Part of genealogy research, therefore, involves management of graph traversal both up and down a family tree or family graph.

With respect to movement up the tree (towards ancestors), the complexity grows exponentially by $2^n$, where n is the number of hops up the tree from a starting point. The effect of this relationship is that the number of ancestors at any given level is double that of the level below it. Traversing a family tree downward (towards progeny) from some ancestor grows even more rapidly by $m^n$ where n is the number of hops down the tree from a starting point, and m is the average number of children in each family. Where average family size is greater than two, which is historically typical, the growth going down the tree is much greater than the growth going up the tree. Managing the traversal of a bi-directional exponentially expanding tree is not a natural (or easy) task for most family history researchers, and yet it is important to making definitive progress in family history research.

The power of some embodiments is the imposed reality that essentially context maintenance is performed by the system, rather than by an individual researcher. In addition to managing the user's data, the system manages the user's overarching goals, the degree and type of information desired per record, the preferred direction of the traversal of the family tree, and other value-based parameters. For example, the interaction may be as follows: User: (Logs in.) System: "Last time you were here we were looking for information about your paternal great-grandfather's brother John. To complete the record for this ancestor, you need a death date and place." The system may be connected to wide area networks such as the Internet to obtain suggestions for further research. For example, the system may display suggestions of possible matches for this individual. Such suggestions can be obtained from various databases and/or indexes, such as the Social Security Death index, familysearch.org, or other repositories of records, such as localized indexes and/or databases.

If none of those databases produces John's missing death information, the system may prompt the user as to other search locations where a manual search may be performed. Such suggestions may be based on other information known about John, such as birth date and location, marriage date and location, death data and location of a spouse, etc. For example, the system may suggest data sources that are related temporally or geographically to already known information. In addition, the system may provide links to appropriate information repositories. The user spends 10 minutes clicking through recommended links and in the present example finds a very likely candidate for the individual in question.

The system may then prompt the user to verify results. System: "We need to verify the relationship of this individual to your existing family tree." The user spends another several minutes looking for information to verify that this is indeed the individual he was looking for. The user's cell phone rings. The user needs to take this call and thus logs out of the system.

One week later . . . User: (Logs in.) System: "Last time you were here we were verifying the death date and place for your paternal great-grandfather's brother John. We had worked through the top four mechanisms for verifying this information. I recommend that you continue with the remaining five recommended verification sources." User: (Spends 15 minutes cross-checking verification sources, and becomes confident that he has the proper individual and the proper death date and place.) System: "Your paternal great-grandfather has four more siblings. If you'd like to look for one of them next, just click the individual and well see what we can do to help."

This example illustrates how context can be preserved and how the system can provide appropriate suggestions for research in one instance. The following discussion illustrates features of other embodiments. The discussion refers to a number of methods and method acts that may be performed to accomplish some of the functionality for some embodiments. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Figure 2:
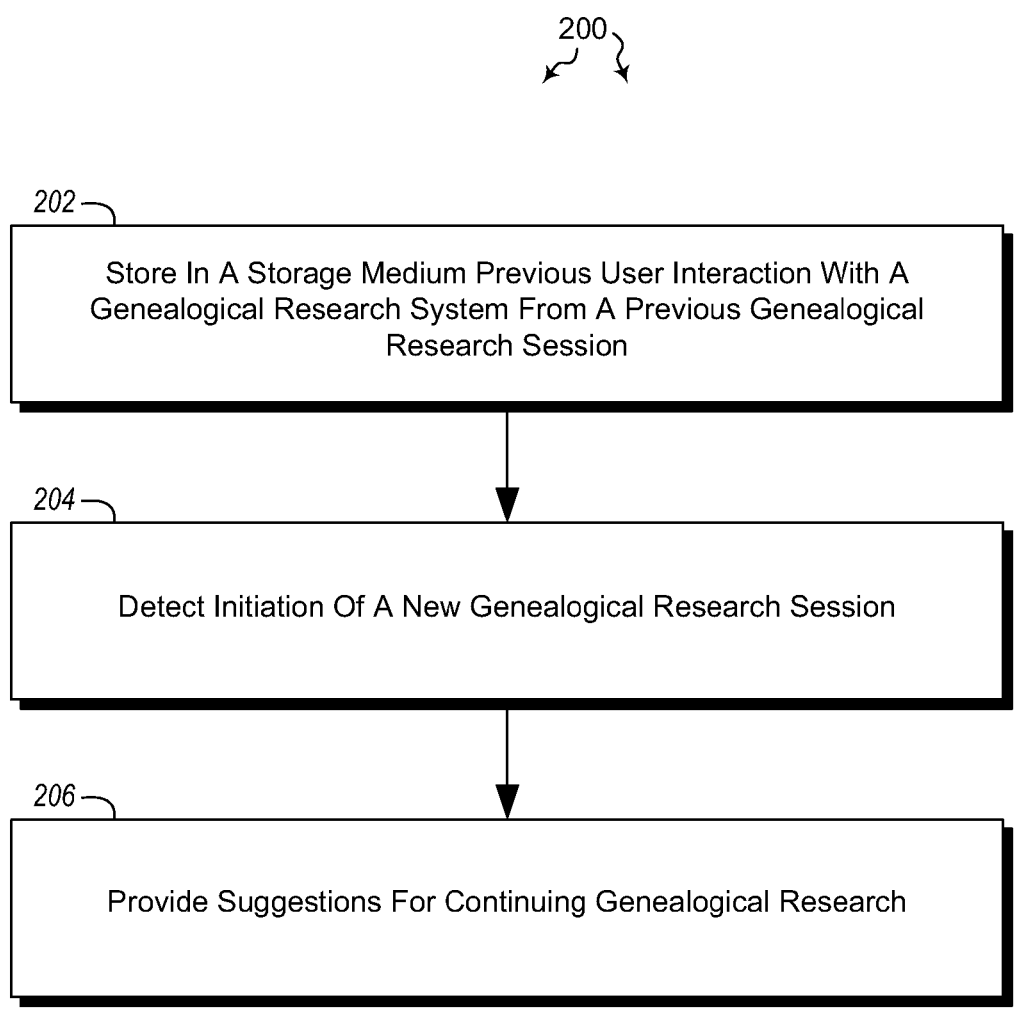
FIG. 2 illustrates a method of preserving context and providing suggestions for genealogy searching

Referring now to FIG. 2, a method 200 is illustrated. The method 200 may be practiced in a computing environment. The method includes acts for preserving context and providing suggestions for genealogy searching. The method includes a computing system storing in a computer readable non-transitory storage medium previous user interaction with a genealogical research system from a previous genealogical research session (act 202). As will be described below, such interaction may be previous searching activities and/or a user configuring user settings specifying research preferences.

The method 200 further includes the system detecting initiation of a new genealogical research session (act 204). For example, the system may detect that a user has logged into the system after a previous log out or shut down of the system.

In response to the new research session and based on the previous user interaction with the research system, the system provides suggestions for continuing genealogical research (act 206). For example, the system may suggest individuals to research, research tasks to be performed, databases to search, etc. Specific examples and details will be illustrated below.

The method 200 may be practiced where providing suggestions comprises suggesting genealogical search activities directed to one or more individuals. For example, the suggestions may be towards an individual that had previously been researched, but for which all desired information (e.g., dates and places) has not been obtained. As illustrated above, the system stored context information about which research activities were previously being performed, i.e. the user was looking for information about their paternal great-grandfather's brother John. The system can track the particular individual that was last researched and provide suggestions based on the last researched individual. Alternatively, individuals may be suggested based on relationships and/or user preferences as discussed below.

The method 200 may be practiced where providing suggestions comprises suggesting genealogical search activities directed to relationships between individuals. For example, the system may suggest that a user attempt to find spouses, children, or parents and to define appropriate relationships between these individuals.

The method 200 may be practiced where providing suggestions comprises suggesting genealogical search activities directed to one or more search databases. For example, if the system knows what type of information is being sought, the system can determine appropriate databases for that type of information. For example, if death dates and places are being sought, the system may execute logic to determine that such information is being sought, such as by determining that information is missing for an individual, and as a result provide the user with possible locations of the information being sought, such as the Social Security Death Index, obituary databases for a particular region and time period, etc. The system may be able to deduce some of these suggestions based on known information such as birth information for an individual, life expectancies for certain periods, marriage information of the individual, etc.

The method 200 may be practiced where providing suggestions comprises suggesting research activities related to one or more individuals based on genealogical closeness of the one or more individuals to at least one other individual. For example, the system may determine that research has recently (such as in the most recent previous session) been completed for an individual. Suggestions of a next individual to be researched may be based on the recently completed research. For example, the system may suggest a spouse, children, or parents to the recently completed individual be completed next. Or if those individuals have already been researched, suggestions for the next closest, such as grandparents or grandchildren may be suggested.

Alternatively, a researcher may be interested in doing breadth first research. This means that a researcher may wish to locate individuals that are generationally the closest, such as siblings first, followed by parents and their siblings, and/or children and their siblings, and so forth. As will be shown later herein, this can be accomplished by the user configuring user settings, so indicating the user's preferences. Accordingly, the system will determine, based on the user settings and past research in previous settings what research to suggest next.

Alternatively still, a researcher may wish to do depth first research. Thus rather than searching for closest relations in terms of generational closeness, the system may suggest research based on individuals farther away generationally for research. For example, a user may wish to research as far back in time as possible, thus the user may specify in user settings that depth first research is preferred. The system can then provide suggestions based on furthest generation distance from an individual to accomplish goals related to depth first searching.

The method 200 may be practiced where providing suggestions comprises suggesting research activities related to geographical considerations. For example, a user may indicate through user settings that the user is interested in lines related to a specified geographical region. For example, a user may be planning a trip to a region and may wish to visit geographical sites to accomplish additional research, and thus may wish for the computer system assisting the research to focus on the geographical region. Thus, the system can provide suggestions based on the user preference for researching a particular geographical region.

The method 200 may be practiced where providing suggestions comprises suggesting research activities related to one or more gaps in a genealogical graph. For example, the system may determine that individuals are missing in a graph or that dates are missing from desired information.

The method 200 may be practiced where providing suggestions comprises suggesting research activities related to one or more individuals based on a type of familial relationship between the one or more individuals to at least one other individual. For example, direct ancestors or decedents of an individual may be preferred over, aunts, uncles, cousins, etc. However, some embodiments may be configured to suggest research on just such relationships over direct descendent or ancestor relationships.

The method 200 may be practiced where providing suggestions comprises suggesting correction of discrepancies or synchronization of disputed data. As noted, the system may be connected via network connections to other systems. As such, other users may be performing research on the same individuals. If two researchers have indicated conflicting data (conflicting dates and places, conflicting relationships, etc.), then the system may suggest that synchronization be performed. Alternatively, the system may include limit testing functionality. For example, if a birth date of a mother occurs after that of a child to the mother, the system can suggest that further research is needed to correct the discrepancy. Alternatively, the system can alert a user to unlikelihoods. For example a system may alert a user to birth dates that would likely not be correct in that they would require a parent to likely be below a reproductive age when a child is born.

The method 200 may be practiced where providing suggestions comprises suggesting that citations be provided for user-provided genealogical data. Systems may require citations to sources of dates and places so as to maintain the accuracy and integrity of research. These systems may have special fields for holding verifiable data. If no such data, or inappropriate data has been entered in the citation fields, the system may suggest that the user provide appropriate citations for collected information.

The method 200 may be practiced where providing suggestions comprises suggesting activities to merge collaborative shared data for an individual or relationship. For example, in an interval between research sessions, another user may have discovered information of interest to the first user. When the first user logs on to the system again, the system can alert the first user to the information and suggest that the information of interest be added to the first user's research records.

The method 200 may be practiced where providing suggestions comprises suggesting other individuals that may be contacted to assist with genealogical research. As noted, other users may be searching for the same or related individuals. The system can include functionality for determining intersecting research or proximate research and thus alert different users of each other's existence. This can further facilitate collaborative research efforts.

The method 200 may be practiced where the previous user interaction comprises previous user searches for attributes related to an individual or relationships between individuals. For example, the system may be able to persist state information based on that fact that a user had been searching for information about a particular individual or group of individuals. This state information can be used for determining suggestions to provide to the user in subsequent sessions.

The method 200 may be practiced where the previous user interaction comprises settings configured by a user indicating preferences for activities. As noted, a user may be able to specify user settings related to a user's interests. For example, a user may be able to specify that depth first searches are preferable. Alternatively, the user may be able to specify that breadth first searches are preferable. The user may be able to specify geographical locations or time periods that are of particular interest. A user may be able to mix interests and to specify and to prioritize and/or rank interests. User selections may be done using graphical radio buttons, buttons, check boxes, drop down menus, text boxes, slider controls, etc.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are non-transitory physical storage media. Computer-readable media that carry computer-executable instructions are transmission media. Thus, by way of example, and not limitation, embodiments of the invention can comprise at least two distinctly different kinds of computer-readable media: physical or non-transitory computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method preserving context and providing suggestions for genealogy searching, the method comprising:

storing in a storage medium indications of previous user interactions for a particular individual user with a genealogical research system from a previous genealogical research session of a particular individual user, the stored indications of previous interactions including identification of specific research tasks performed in previous genealogical research sessions and association the specific research tasks with the previous genealogical research sessions so as to maintain research context of the particular individual user by identifying recently performed specific research tasks;

based on the stored previous user interactions, including specific research tasks performed, identifying specific research tasks that are yet to be performed by the particular individual user to achieve an individual user's overarching research goals;

storing in a storage medium indications of the identified specific research tasks that are yet to be performed by the particular individual user to achieve an individual user's overarching research goals;

detecting initiation of a new genealogical research session by the particular individual user; and in response to the new research session and based on previous user interactions of the particular individual user with the research system, providing suggestions for continuing genealogical research based on previous research context and research history, by providing suggestions, including the identified specific research tasks that are yet to be performed by the particular individual user, to meet the particular individual user's overarching genealogical research goals as determined based one the particular user's previous interactions, including specific research tasks performed in previous genealogical research sessions.

2. The method of claim 1, wherein providing suggestions comprises suggesting specific genealogical search activities directed to one or more individuals that still need to be performed.

3. The method of claim 1, wherein providing suggestions comprises suggesting specific genealogical search activities directed to relationships between individuals that still need to be performed.

4. The method of claim 1, wherein providing suggestions comprises suggesting specific genealogical search activities directed to one or more search methods that still need to be performed.

5. The method of claim 1, wherein providing suggestions comprises suggesting specific genealogical search activities directed to one or more search databases that still need to be performed.

6. The method of claim 1, wherein the previous user interactions comprises attributes of previous user searches related to an individual or relationships between individuals.

7. The method of claim 1, wherein the previous user interactions comprises settings configured by a user indicating preferences for activities.

8. The method of claim 1, wherein providing suggestions comprises suggesting specific research activities related to one or more individuals based on genealogical closeness of the one or more individuals to at least one other individual that still need to be performed.

9. The method of claim 1, wherein providing suggestions comprises suggesting specific research activities related to geographical considerations that still need to be performed.

10. The method of claim 1, wherein providing suggestions comprises suggesting specific research activities related to one or more gaps in a genealogical graph that still need to be performed.

11. The method of claim 10, wherein at least one of the gaps represents a missing individual.

12. The method of claim 10, wherein at least one of the gaps represents a missing date.

13. The method of claim 1, wherein providing suggestions comprises suggesting specific research activities related to one or more individuals based on a type of familial relationship between the one or more individuals to at least one other individual that still need to be performed.

14. The method of claim 1, wherein providing suggestions comprises suggesting other individuals that may be contacted to assist with genealogical research.

15. The method of claim 1, wherein providing suggestions comprises suggesting that citations be provided for user provided genealogical data.

16. The method of claim 1, wherein providing suggestions comprises suggesting correction of discrepancies or disputed data.

17. The method of claim 1, wherein providing suggestions comprises suggesting activities to merge collaborative shared data for an individual or relationship.

18. The method of claim 1, wherein storing in a storage medium indications of previous user interactions for a particular individual user with a genealogical research system from a previous genealogical research session comprises storing an indication of data sources, from a previously indentified set of data sources, that have already been searched in a previous genealogical research session for missing information and wherein providing suggestions for continuing genealogical research based on previous research context and research history comprises identifying to the user any remaining data sources from the previously identified set of sources that were not already searched for the missing information in previous genealogical research sessions.

19. In a computing environment, a physical computer storage media that excludes signal and carrier waves comprising computer executable instructions that when executed by one or more computer processors causes the following to be performed:

storing in a storage medium indications previous user interactions for a particular individual user with a genealogical research system from a previous genealogical research session of the particular individual user, the stored indication of previous interactions including identification of specific research tasks performed in previous genealogical research sessions and associating the specific research tasks with the previous genealogical research sessions so as to maintain research context of the particular individual user by identifying recently performed specific research tasks;

based on the stored previous user interactions, including specific research tasks performed, identifying specific research tasks that are yet to be performed by the particular individual user to achieve an individual user's overarching research goals;

storing in a storage medium indications of the identified specific research tasks that are yet to be performed by the particular individual user to be achieve an individual user's overarching research goals;

detecting initiation of a new genealogical research session by the particular individual user; and in response to the new research session and based on previous user interactions of the particular individual user with the research system, providing suggestions for continuing genealogical research based on previous research context and research history, by providing suggestions, including the identified specific research tasks that are yet to be performed by the particular individual user, to meet the particular individual user's overarching genealogical research goals as determined based on the particular user's previous interactions, including specific research tasks performed in previous genealogical research sessions.

20. In a computing environment, one or more computer processors;

a computer memory comprising a computer readable storage medium comprising computer executable instructions that when executed by one or more computer processors causes the following to performed:

storing in a storage medium indications of previous user interactions for a particular individual user with a genealogical research system from a previous genealogical research session of the particular individual user, the stored indication of previous interactions including identification of specific research tasks performed in previous genealogical research sessions and associating the specific research tasks with the previous genealogical research sessions so as to maintain research context of the particular individual user by identifying recently performed specific research tasks;

based on the stored previous user interaction, including specific research tasks performed, identifying specific research tasks that are yet to ne performed by the particular individual user to achieve and individual user's overarching research goals;

storing in a storage medium indications of the identified specific research tasks that are yet to be performed by the particular individual user to achieve an individual user's overarching research goals;

detecting initiation of a new genealogical research session by the particular individual user; and in response to the new research session and based on previous user interactions of the particular individual user with the research system, providing suggestions for continuing genealogical research based on previous research context and research history, by providing suggestions, including the identified specific research tasks that are yet to be performed by the particular individual user, to meet the particular individual user's overarching genealogical research goals as determined based on the particular user's previous interactions, including specific research tasks performed in previous genealogical research sessions.

* * * * *